(12) United States Patent
Ross et al.

(10) Patent No.: US 9,189,430 B2
(45) Date of Patent: Nov. 17, 2015

(54) APPARATUS AND METHODS FOR SERIAL INTERFACES

(75) Inventors: James Henry Ross, Cedar Rapids, IA (US); Florinel G. Balteanu, Ottawa (CA)

(73) Assignee: Skyworks Solutions, Inc., Woburn, MA (US)

( * ) Notice: Subject to any disclaimer, the term of this patent is extended or adjusted under 35 U.S.C. 154(b) by 228 days.

(21) Appl. No.: 13/349,815

(22) Filed: Jan. 13, 2012

(65) Prior Publication Data

US 2012/0185623 A1    Jul. 19, 2012

Related U.S. Application Data

(60) Provisional application No. 61/433,093, filed on Jan. 14, 2011.

(51) Int. Cl.
*G06F 13/12* (2006.01)
*G06F 13/38* (2006.01)
*G06F 1/26* (2006.01)
G06F 21/00 (2013.01)
G06F 7/58 (2006.01)

(52) U.S. Cl.
CPC .............. *G06F 13/12* (2013.01); *G06F 1/266* (2013.01); *G06F 7/58* (2013.01); *G06F 21/00* (2013.01)

(58) Field of Classification Search
CPC ............ G06F 1/266; G06F 7/58; G06F 21/00
USPC ..................................... 710/63, 69, 70, 71, 72
See application file for complete search history.

(56) References Cited

U.S. PATENT DOCUMENTS

| 4,371,928 | A | * | 2/1983 | Barlow et al. ................. 710/307 |
| 5,875,353 | A | * | 2/1999 | Whetsel .......................... 710/38 |
| 6,407,960 | B1 | * | 6/2002 | Egbert et al. ............. 365/230.04 |
| 7,827,330 | B2 | * | 11/2010 | Richards et al. ................. 710/69 |
| 7,962,662 | B2 | * | 6/2011 | Richards et al. ................... 710/9 |
| 8,423,823 | B2 | * | 4/2013 | Venus et al. ..................... 714/13 |
| 2003/0070025 | A1 | * | 4/2003 | Watts et al. .................... 710/305 |
| 2005/0108454 | A1 | * | 5/2005 | Baker et al. .................... 710/110 |
| 2009/0031048 | A1 | * | 1/2009 | Richards et al. ................... 710/3 |
| 2009/0292843 | A1 | * | 11/2009 | Haban et al. ................... 710/110 |

FOREIGN PATENT DOCUMENTS

| EP | 0613147 B1 * | 8/1999 | ............... G11C 5/00 |
| EP | 2003548 B1 * | 3/2011 | ............... G06F 9/32 |

* cited by examiner

*Primary Examiner* — Idriss N Alrobaye
*Assistant Examiner* — Getente A Yimer
(74) *Attorney, Agent, or Firm* — Knobbe, Martens, Olson & Bear, LLP

(57) ABSTRACT

Apparatus and methods for serial interfaces are provided. In one embodiment, an integrated circuit operable to communicate over a serial interface is provided. The integrated circuit includes analog circuitry, registers for controlling the operation of the analog circuitry, and a distributed slave device including a primary block and a secondary block. The registers are accessible over the serial interface using a shared register address space. Additionally, the primary block is electrically connected to the serial interface and to a first portion of the registers and the secondary block is electrically connected to the primary block and to a second portion of the registers.

18 Claims, 6 Drawing Sheets

| | |
|---|---|
| REGISTER 1 | |
| REGISTER 2 | |
| REGISTER 3 | |
| ⋮ | |
| REGISTER 16 | |
| REGISTER 17 | |
| REGISTER 18 | |
| REGISTER 19 | |
| ⋮ | |
| REGISTER 32 | |
| REGISTER 33 | |
| REGISTER 34 | |
| REGISTER 35 | |
| ⋮ | |
| REGISTER 48 | |
| REGISTER 49 | |
| REGISTER 50 | |
| REGISTER 51 | |
| ⋮ | |
| REGISTER 64 | |

FIG.7

APPARATUS AND METHODS FOR SERIAL INTERFACES

CROSS-REFERENCE TO RELATED APPLICATIONS

This application claims the benefit of priority under 35 U.S.C. §119(e) of U.S. Provisional Patent Application No. 61/433,093, filed Jan. 14, 2011 entitled "APPARATUS AND METHODS FOR SERIAL INTERFACES", which is herein incorporated by reference in its entirety.

BACKGROUND

1. Field

Embodiments of the invention relate to electronic systems, and in particular, to serial interfaces for electronic systems.

2. Description of the Related Technology

Various electronic systems, such as mixed-signal electronic systems, can include a serial interface for writing data to and/or reading data from one or more integrated circuits (ICs). For example, a radio frequency (RF) system can include a serial peripheral interface (SPI) bus for writing and reading registers of an envelope tracking system for a power amplifier. The registers can include information for setting, for example, a power mode and/or a frequency band of operation of the power amplifier.

A serial interface can include a master device and one or more slave devices, which can be disposed across a plurality of ICs. The master device can broadcast a command over the serial interface to the slave devices, such as a command to write a certain register associated with a particular slave device. To aid in identifying the selected slave device and register, a slave address and register identifier can be broadcasted over the interface. Each slave device can analyze the slave address to determine if the command is designated for the slave device, and if so, the selected slave device can use the register identifier and a register mapping table to locate the targeted register.

SUMMARY

In certain embodiments, the present disclosure relates to an integrated circuit operable to communicate over a serial interface. The integrated circuit includes analog circuitry, a plurality of registers for controlling the operation of the analog circuitry, and a distributed slave device including a primary block and a first secondary block. The plurality of registers is accessible over the serial interface using a shared register address space. The primary block is electrically connected to the serial interface and to a first portion of the registers, and the first secondary block electrically connected to the primary block and to a second portion of the registers.

In various embodiments, the distributed slave device includes a register mapping table having entries for each of the registers.

In some embodiments, each of the registers is individually readable and writable over the serial interface using the distributed slave device and the register mapping table.

In a number of embodiments, the primary block is configured to drive the serial interface when the serial interface indicates that a first register associated with the first portion of registers is being read.

In certain embodiments, the first secondary block is configured to drive the serial interface when the serial interface indicates that a second register associated with the second portion of registers is being read.

In some embodiments, the serial interface is a serial peripheral interface (SPI) including an input data signal, an output data signal, and a clock signal.

According to a number of embodiments, the distributed slave device is selectable over the serial interface by broadcasting a single slave address on the input data signal.

In various embodiments, the primary block is electrically connected to the input data signal, the output data signal and the clock signal, and the first secondary block is electrically connected to the input data signal and the clock signal but not to the output data signal.

In some embodiments, the integrated circuit further includes a second secondary block electrically connected to the primary block and to a third portion of the plurality of the registers.

In several embodiments, the primary block includes a multiplexer configured to generate the output signal by selecting amongst an output provided by the primary block, an output provided by the first secondary block, and an output provided by the second secondary block.

According to certain embodiments, the multiplexer is configured to select amongst the output provided by the primary block, the output provided by the first secondary block, and the output provided by the second secondary block primary block based upon a register indicator received on the input signal.

In certain embodiments, a digital portion of the first secondary block and a digital portion of the second secondary block are separated by at least about 100 μm so as to reduce routing resources used in electrically connecting the primary block to the first portion of the registers and electrically connecting the first secondary block to the second portion of registers.

In various embodiments, each of the plurality of registers is individually readable and writable over the serial interface using the distributed slave device.

In various embodiments, the analog circuitry is configured to operate as an envelope tracker for a power amplifier.

In accordance with several embodiments, the first portion of the registers is configured to control a first portion of the analog circuitry and the second portion of registers is configured to control a second portion of the analog circuitry.

In certain embodiments, the present disclosure relates to a method of reading a register of an integrated circuit using a serial interface. The method includes receiving over the serial interface a slave address selecting a distributed slave device of the integrated circuit, the distributed slave device including a primary block associated with a first portion of registers of the integrated circuit and a secondary block associated with a second portion of registers of the integrated circuit. The method further includes receiving over the serial interface a register indicator indicating a register of the integrated circuit. The method further includes driving the serial interface using the primary block when the serial interface indicates that the register is associated with the first portion of registers, driving the serial interface using the secondary block when the serial interface indicates that the register is associated with the second portion of registers.

In a number of embodiments, the serial interface is a serial peripheral interface (SPI) including an input data signal, an output data signal, and a clock signal.

In various embodiments, the method further includes providing the input data signal and the clock signal to the primary block and to the secondary block.

In accordance with several embodiments, the method further includes generating the output data signal by multiplexing between an output of the primary block and an output of the secondary block.

In several embodiments, generating the output data signal further includes selecting between the output of the primary block and the output of the secondary block based upon the register indicator.

BRIEF DESCRIPTION OF THE DRAWINGS

FIG. 7 is a register mapping table in accordance with one embodiment.

DETAILED DESCRIPTION OF EMBODIMENTS

The headings provided herein, if any, are for convenience only and do not necessarily affect the scope or meaning of the claimed invention.

A serial interface can consume a significant amount of resources of an IC. For example, to permit the slave device to read and/or write each register in the device's register mapping table, the slave device can be electrically connected to each of the registers using one or more connections within the IC. However, each of these connections can consume valuable routing resources of the IC. For relatively large ICs, the connections can span across a relatively large distance, and can interfere with the routing of other signals. To alleviate the routing congestion, a plurality of slave devices can be provided on an IC. However, including a plurality of slave devices can increase the number of slave addresses of the interface, the number of register mapping tables of the IC, and/or the pin count of the IC.

There is a need for improved serial interfaces. Furthermore, there is a need for slave devices for serial interfaces that consume less routing resources, and which do not require additional slave addresses, register mapping tables, and/or pins. Provided herein are various non-limiting examples of devices and methods for use with serial interfaces.

Figure 1:
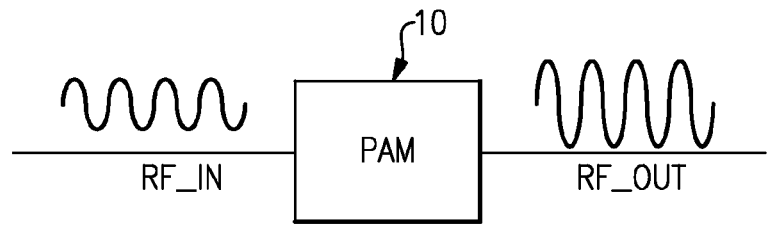
FIG. 1 is a schematic diagram of a power amplifier module for amplifying a radio frequency (RF) signal.

FIG. 1 is a schematic diagram of a power amplifier module for amplifying a radio frequency (RF) signal. The illustrated power amplifier module (PAM) 10 can be configured to amplify an RF signal RF_IN to generate an amplified RF signal RF_OUT. As described herein, the power amplifier module can include one or more power amplifiers.

Power amplifiers can be included in mobile devices to amplify a RF signal for transmission via an antenna. For example, in mobile devices having a time division multiple access (TDMA) architecture, such as those found in Global System for Mobile Communications (GSM), code division multiple access (CDMA), and wideband code division multiple access (W-CDMA) systems, a power amplifier can be used to amplify a RF signal having a relatively low power. It can be important to manage the amplification of a RF signal, as a desired transmit power level can depend on how far the user is away from a base station and/or the mobile environment. Power amplifiers can also be employed to aid in regulating the power level of the RF signal over time, so as to prevent signal interference from transmission during an assigned receive time slot.

The power consumption of a power amplifier can be an important consideration. One technique for reducing power consumption of a power amplifier is envelope tracking, in which the voltage level of the power supply of the power amplifier is changed in relation to the envelope of the RF signal. Thus, when the envelope of the RF signal increases, the voltage supplied to the power amplifier can be increased. Likewise, when the envelope of the RF signal decreases, the voltage supplied to the power amplifier can be decreased to reduce power consumption.

Figure 2:
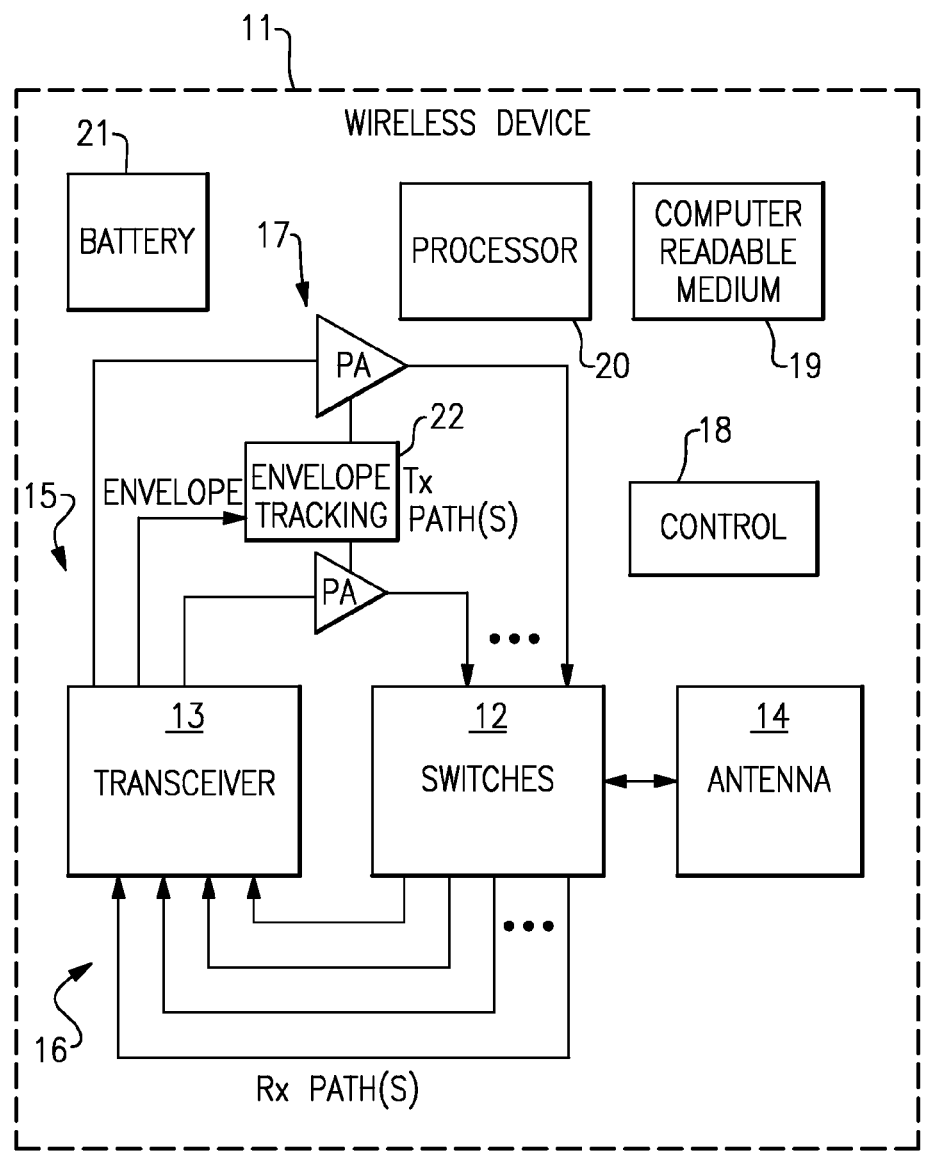
FIG. 2 is a schematic block diagram of an example wireless device that can include one or more of the power amplifier modules of FIG. 1.

FIG. 2 is a schematic block diagram of an example mobile or wireless device 11 that can include one or more of the power amplifier modules 10 of FIG. 1. The wireless device 11 can implement one or more features of the present disclosure.

The example wireless device 11 depicted in FIG. 2 can represent a multi-band and/or multi-mode device such as a multi-band/multi-mode mobile phone. By way of examples, Global System for Mobile (GSM) communication standard is a mode of digital cellular communication that is utilized in many parts of the world. GSM mode mobile phones can operate at one or more of four frequency bands: 850 MHz (approximately 824-849 MHz for Tx, 869-894 MHz for Rx), 900 MHz (approximately 880-915 MHz for Tx, 925-960 MHz for Rx), 1800 MHz (approximately 1710-1785 MHz for Tx, 1805-1880 MHz for Rx), and 1900 MHz (approximately 1850-1910 MHz for Tx, 1930-1990 MHz for Rx). Variations and/or regional/national implementations of the GSM bands are also utilized in different parts of the world.

Code division multiple access (CDMA) is another standard that can be implemented in mobile phone devices. In certain implementations, CDMA devices can operate in one or more of 800 MHz, 900 MHz, 1800 MHz and 1900 MHz bands, while certain W-CDMA and Long Term Evolution (LTE) devices can operate over, for example, about 22 radio frequency spectrum bands.

One or more features of the present disclosure can be implemented in the foregoing example modes and/or bands, and in other communication standards. For example, 3G, 4G, LTE, and Advanced LTE are non-limiting examples of such standards.

In certain embodiments, the wireless device 11 can include switches 12, a transceiver 13, an antenna 14, power amplifiers 17, a control component 18, a computer readable medium 19, a processor 20, a battery 21, and an envelope tracking block 22.

The transceiver 13 can generate RF signals for transmission via the antenna 14. Furthermore, the transceiver 13 can receive incoming RF signals from the antenna 14.

It will be understood that various functionalities associated with the transmission and receiving of RF signals can be achieved by one or more components that are collectively represented in FIG. 2 as the transceiver 13. For example, a single component can be configured to provide both transmitting and receiving functionalities. In another example, transmitting and receiving functionalities can be provided by separate components.

Similarly, it will be understood that various antenna functionalities associated with the transmission and receiving of RF signals can be achieved by one or more components that are collectively represented in FIG. 2 as the antenna 14. For example, a single antenna can be configured to provide both transmitting and receiving functionalities. In another example, transmitting and receiving functionalities can be provided by separate antennas. In yet another example, different bands associated with the wireless device 11 can be provided with different antennas.

In FIG. 2, one or more output signals from the transceiver 13 are depicted as being provided to the antenna 14 via one or more transmission paths 15. In the example shown, different transmission paths 15 can represent output paths associated with different bands and/or different power outputs. For instance, the two example power amplifiers 17 shown can represent amplifications associated with different power output configurations (e.g., low power output and high power output), and/or amplifications associated with different bands. Although FIG. 2 illustrates the wireless device 11 as including two transmission paths 15, the wireless device 11 can be adapted to include more or fewer transmission paths 15.

In FIG. 2, one or more detected signals from the antenna 14 are depicted as being provided to the transceiver 13 via one or more receiving paths 16. In the example shown, different receiving paths 16 can represent paths associated with different bands. For example, the four example receiving paths 16 shown can represent quad-band capability that some wireless devices are provided with. Although FIG. 2 illustrates the wireless device 11 as including four receiving paths 16, the wireless device 11 can be adapted to include more or fewer receiving paths 16.

To facilitate switching between receive and transmit paths, the switches 12 can be configured to electrically connect the antenna 14 to a selected transmit or receive path. Thus, the switches 12 can provide a number of switching functionalities associated with operation of the wireless device 11. In certain embodiments, the switches 12 can include a number of switches configured to provide functionalities associated with, for example, switching between different bands, switching between different power modes, switching between transmission and receiving modes, or some combination thereof. The switches 12 can also be configured to provide additional functionality, including filtering and/or duplexing of signals.

FIG. 2 shows that in certain embodiments, a control component 18 can be provided for controlling various control functionalities associated with operations of the switches 12, the power amplifiers 17, the envelope tracking block 22, and/or other operating components.

In certain embodiments, a processor 20 can be configured to facilitate implementation of various processes described herein. For the purpose of description, embodiments of the present disclosure may also be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

In certain embodiments, these computer program instructions may also be stored in a computer-readable memory 19 that can direct a computer or other programmable data processing apparatus to operate in a particular manner, such that the instructions stored in the computer-readable memory produce an article of manufacture including instruction means which implement the acts specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide steps for implementing the acts specified in the flowchart and/or block diagram block or blocks.

The illustrated wireless device 11 also includes the envelope tracking block 22, which can be used to provide a power supply to one or more of the power amplifiers 17. For example, the enveloping tracking block 22 can control the supply voltage provided to the power amplifiers 17 based upon an envelope of the RF signal to be amplified.

The envelope tracking block 22 can be electrically connected to the battery 21, and the envelope tracking block 22 can be configured to control the voltage level of the power supply provided to the power amplifiers 17 based on an envelope of the RF signal to be amplified. The battery 21 can be any suitable battery for use in the wireless device 11, including, for example, a lithium-ion battery. By changing the voltage provided to the power amplifiers based on the envelope signal, the power consumption of the battery 21 can be reduced, thereby improving performance of the wireless device 11. The envelope signal can be provided to the envelope tracking block 22 from the transceiver 13. However, the envelope can be determined in other ways. For example, the envelope can be determined by detecting the envelope from the RF signal using any suitable envelope detector.

Figure 3:
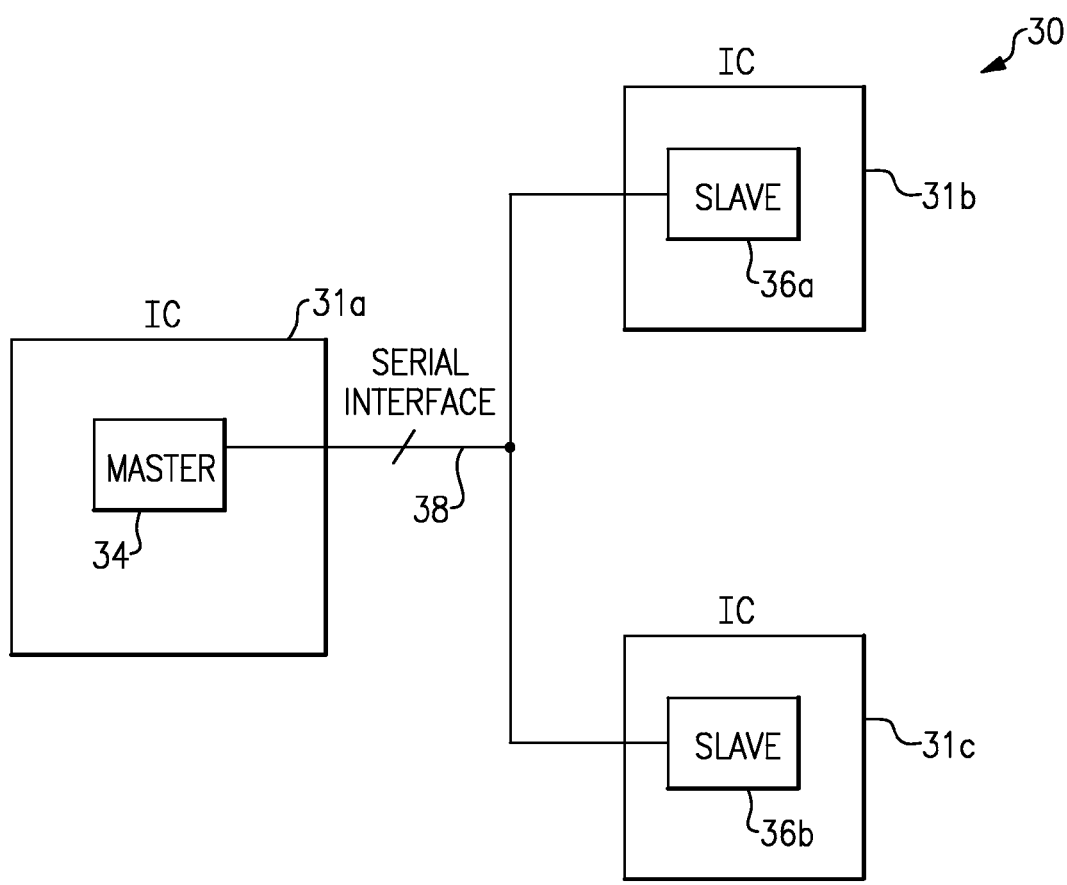
FIG. 3 is a schematic block diagram of an electronic system including a serial interface.

FIG. 3 is a schematic block diagram of an electronic system 30 including a serial interface 38. The electronic system 30 includes a first IC 31a, a second IC 31b, and a third IC 31c. The first IC 31a includes a master device 34, the second IC 31b includes a first slave device 36a, and the third IC 31c includes a second slave device 36b. The first, second and third ICs 31a-31c are electrically connected over the serial interface 38, which can be, for example, a serial peripheral interface (SPI). Although the electronic system 30 is illustrated for the case of three ICs, the electronic system 30 can be adapted to include more or fewer ICs. Additionally, although only one slave device is illustrated on each of the second and third ICs 31b, 31c, the second and third ICs can each include additional slave devices.

The electronic system 30 can be, for example, a radio frequency (RF) system, such as the wireless device 11 of FIG. 2. For example, the first IC 31a can operate as a transceiver, the second IC 31b can operate as an envelope tracking module for a power amplifier, and the third IC 31c can operate as a front-end module for the transceiver. However, other implementations are possible.

Figure 4A:
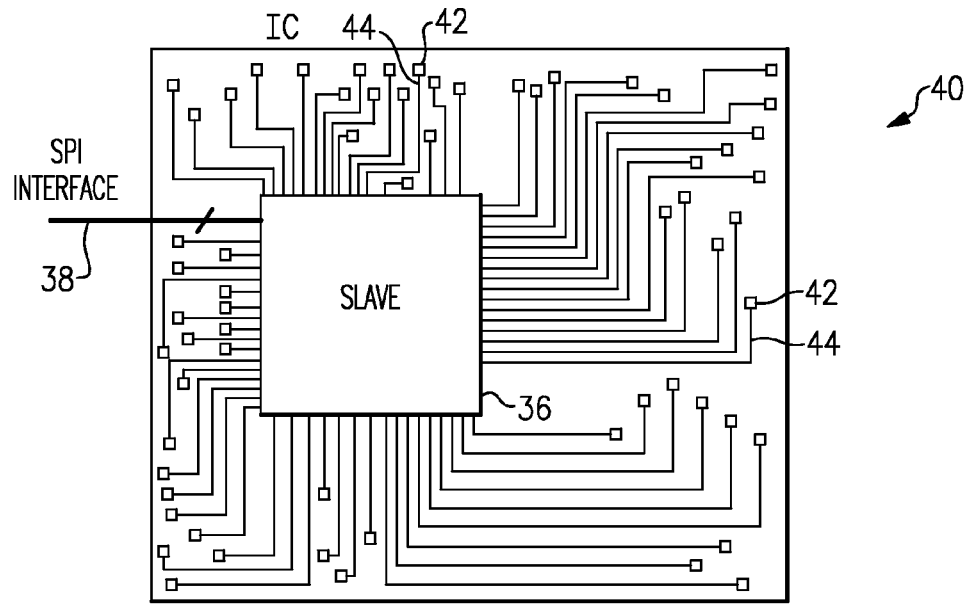
FIG. 4A is a schematic block diagram of an IC including a slave device.

FIG. 4A is a schematic block diagram of an IC 40 including a slave device 36. The IC 40, can be, for example, the second or third ICs 31b, 31c of FIG. 3. The IC 40 includes the slave device 36, which is electrically connected to the SPI interface 38. Additionally, the slave device 36 is electrically connected to registers 42 over connections 44.

A master device (not illustrated in this figure) can use the SPI interface 38 to provide a command to the slave device 36. The command can include a slave address identifying the slave device 36 and a register identifier associated with a particular register of the registers 42. The slave device 36 can use a register mapping table and the register identifier to locate the selected register, and can use the connections 44 to communicate with the selected register to execute the command.

Since the registers 42 can be distributed across the IC 40, the connections 44 also can be distributed across the IC 40. For ICs having a large number of registers 42, the connections 44 can be consume a significant amount of routing resources. Moreover, in implementations where the IC 40 is a mixed-signal IC, the layout of the IC 40, including the connections 44, may be designed by layout engineers, rather than using place-and-route tools. Thus, providing the connections 42 in certain applications can consume a significant amount of engineer-hours.

To alleviate the routing congestion, the IC 40 can include several independent slave devices 36. However, providing multiple slave devices 36 can increase the number of slave addresses of the SPI interface 38, increase pin count of the IC 40, and/or increase the number of register mapping tables, since each slave device can use a different register mapping table.

Figure 4B:
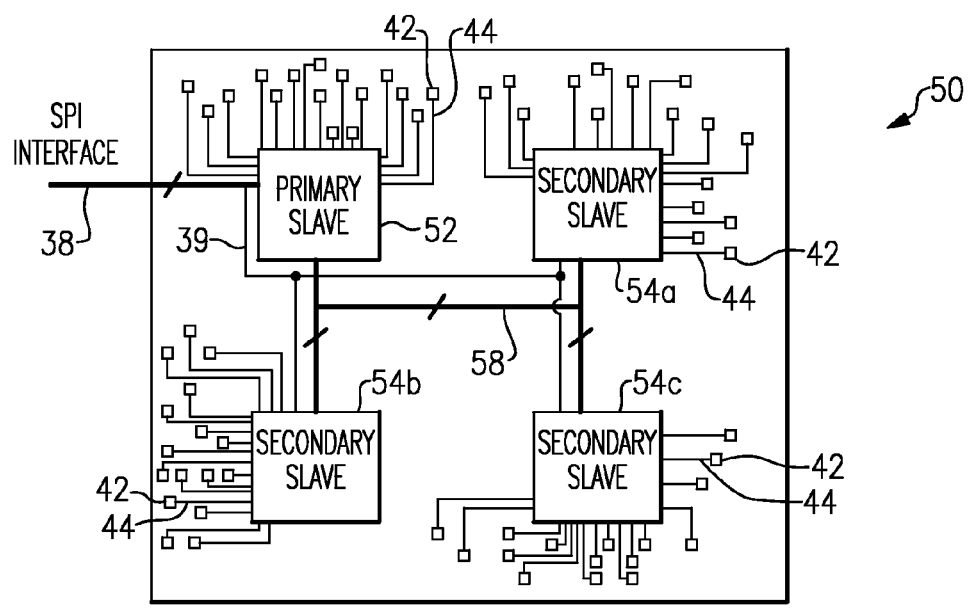
FIG. 4B is a schematic block diagram of an IC including a distributed slave device in accordance with one embodiment.

FIG. 4B is a schematic block diagram of an IC 50 including a distributed slave device in accordance with one embodiment. The distributed slave device includes a primary slave block 52 and first to third secondary slave blocks 54a-54c.

The primary slave block 52 is electrically connected to the SPI interface 38, to a first portion of the registers 42, and to each of the first to third secondary slave blocks 54a-54c. The first secondary slave block 54a is electrically connected to the primary slave block 52, to a second portion of the registers 42, and to interface signals 39, which can include all or part of the signals of the SPI interface 38. Similarly, the secondary slave block 54b is electrically connected to the primary slave block 52, to a third portion of the registers 42, and to interface signals 39, and the secondary slave block 54c is electrically connected to the primary slave block 52, to a fourth portion of the registers 42, and to interface signals 39.

In certain implementations, the primary slave block 52 is interconnected to the first, second and/or third second slave blocks 54a-54c using one or more additional signals 58. The additional signals 58 can include, for example, control signals and/or one or more output and/or enable signals generated from each of the secondary slave blocks 54a-54c that can be used to drive the SPI interface 38.

As illustrated in FIG. 4B, the distributed slave device has been partitioned into multiple blocks, and each block has been electrically connected to a portion of the registers 42. By partitioning the slave device in this manner, the amount of routing resources consumed by the connections 44 can be reduced. For example, the total length of all connections 44 to the registers 42 can be shorter when using a distributed slave device.

From the perspective of a master device, the distributed slave device of FIG. 4B can appear to operate as a single slave device. Accordingly, the distributed slave device can operate using a single SPI interface, thereby reducing pin count of the IC 50 relative to a scheme in which multiple slave devices and multiple SPI interfaces are employed. Furthermore, as will be described below, the distributed slave device need not include additional register mapping tables and/or slave addresses. Rather, the distributed slave device can be configured to operate using a shared register mapping table, thereby operating using a common register address space.

Although FIG. 4B is illustrated for an implementation in which the distributed slave device includes a primary slave block and three secondary slave blocks, the distributed slave device can include more or fewer secondary slave blocks. For example, in one implementation, the distributed slave device includes two or more secondary slave blocks.

Figure 5:
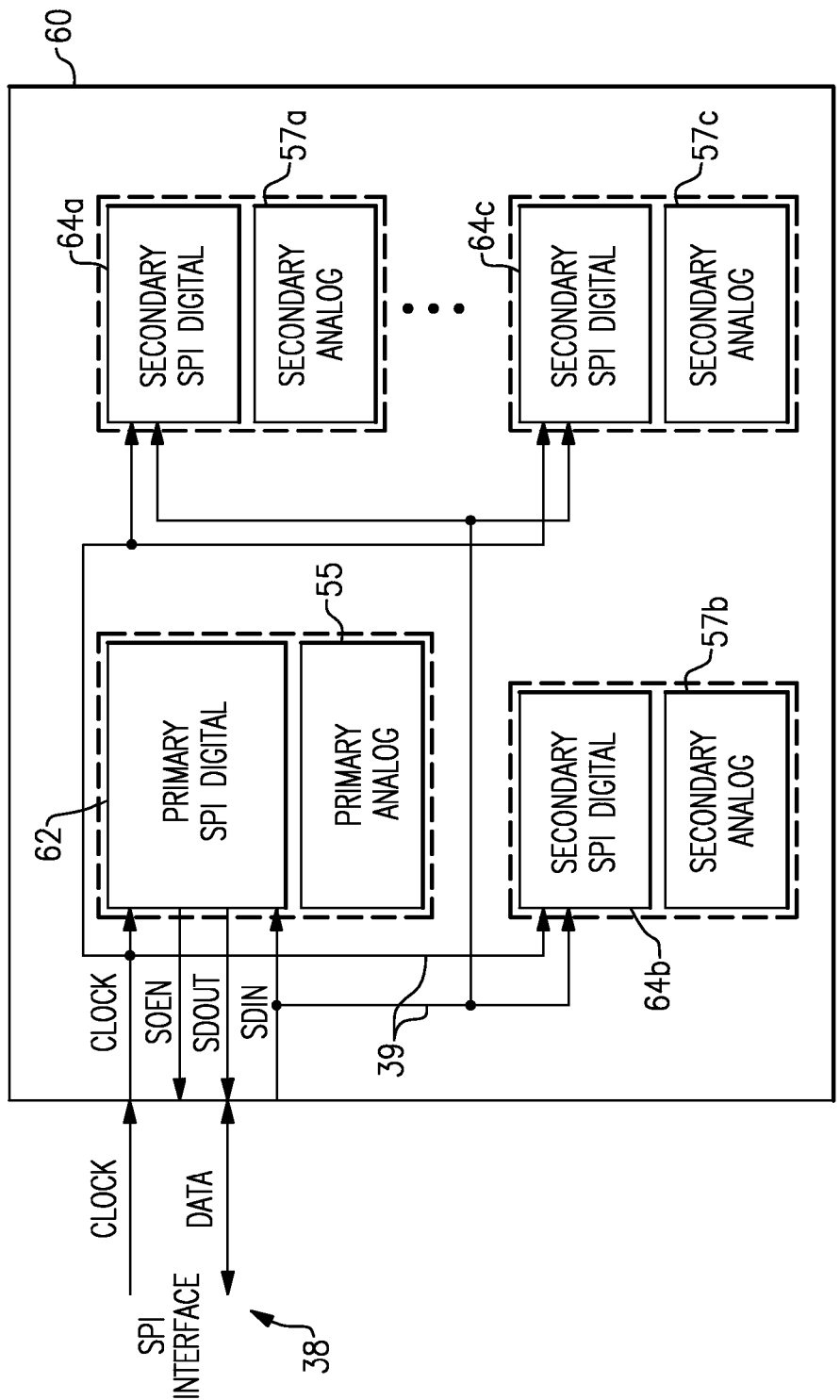
FIG. 5 is a schematic block diagram of an IC including a distributed slave device in accordance with another embodiment.

FIG. 5 is a schematic block diagram of an IC 60 including a distributed slave device in accordance with another embodiment. The IC 60 includes a primary analog block 55, first to third secondary analog blocks 57a-57c, a primary slave digital block 62, and first to third secondary slave digital blocks 64a-64c.

The distributed slave device includes the primary slave digital block 62 and the first to third secondary slave digital blocks 64a-64c. The primary slave digital block 62 can be associated with registers for controlling operation of the primary analog block 55. Similarly, the first to third secondary slave digital blocks 64a-64c can be associated with registers for controlling operation of the first to third secondary analog blocks 57a-57c, respectively.

In one implementation, the IC 60 is an envelope tracking die for a power amplifier, and the primary analog block 55 and the secondary analog blocks 57a-57c include analog circuitry of the envelope tracker, such as buck-boost converter circuitry and/or error amplifier circuitry. The operation of the primary analog block 55 and the secondary analog blocks 57a-57c can be controlled at least in part by the values of the registers associated with the primary slave digital block 62 and the first to third secondary slave digital blocks 64a-64c. Although the IC 60 can be an envelope tracking die, other configurations are possible, such as implementations in which the IC 60 is a front-end module.

As illustrated in FIG. 5, the SPI interface 38 includes data signals and a clock or CLOCK signal. The data signals include an output or SDOUT signal and an input or SDIN signal. The CLOCK, SDIN, and SDOUT signals have been provided to the primary slave digital block 62, while the CLOCK and SDIN signals have been provided to the secondary slave digital blocks 64a-64c. The primary slave digital block 62 also has been configured to generate a driver enable or SOEN signal, which can be used to enable a driver used to drive the SDOUT signal of the SPI interface 38. The SOEN signal can aid in preventing the distributed slave device from driving the SDOUT signal at an inappropriate time, such as when another slave device (see, for example, FIG. 3) is driving the SPI interface 38.

Each of the digital blocks 62, 64a-64c can be separated by a relatively large distance. In one implementation, the digital blocks 62, 64a-64c are disposed on a single IC, but the digital blocks 62, 64a-64c are each separated from one another by a distance greater than about 100 μm.

In the illustrated embodiment, each of the digital blocks 62, 64a-64c of the distributed slave device is configured to receive the interface signals 39, which include the CLOCK and SDIN signals. In certain implementations, the SDIN signal can be used to provide a slave address and a register indicator to the digital blocks 62, 64a-64c. Each of the digital blocks 62, 64a-64c of the slave device can determine if the slave device has been selected over the SPI interface 38 by analyzing the slave address broadcasted using the SDIN signal. Additionally, if the slave address broadcasted using the SDIN signal matches that of the distributed slave device, each of the digital blocks 62, 64a-64c can analyze the register indicator broadcasted over the SDIN signal to determine if the register indicator is associated with a register of the particular digital block. By configuring the distributed slave device in this manner, the distributed slave device can include one mapping table partitioned amongst the digital blocks 62, 64a-64c.

Figure 6:
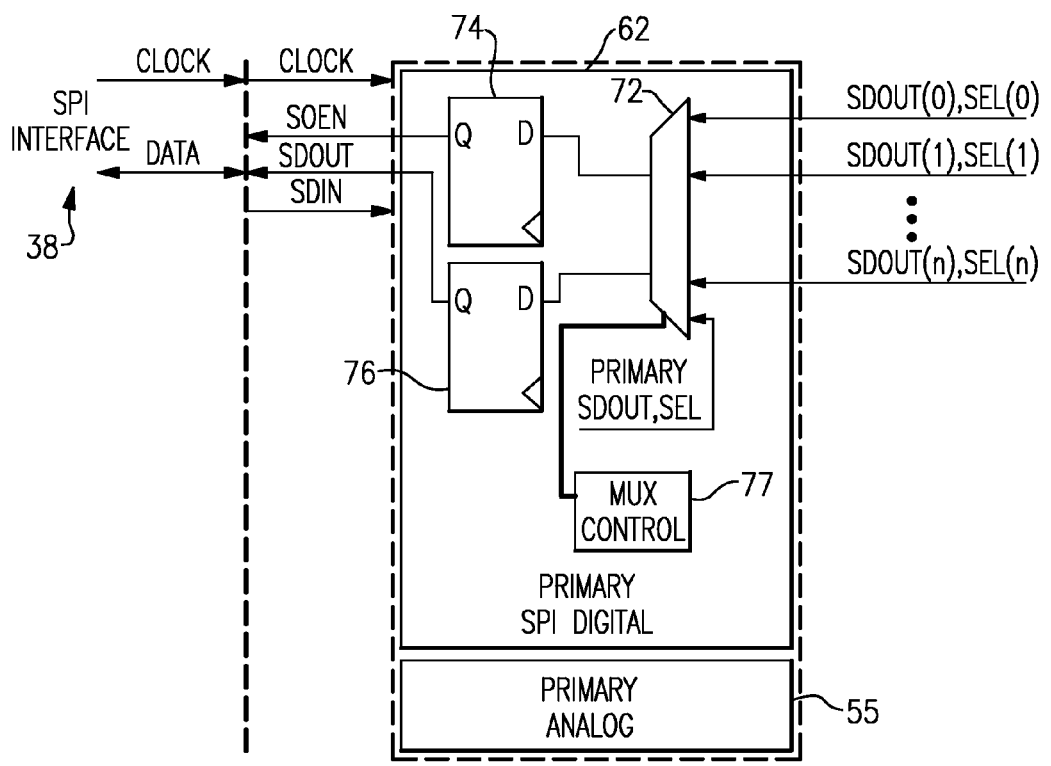
FIG. 6 is a schematic block diagram of a primary analog block and a primary digital block in accordance with one embodiment.

FIG. 6 is a schematic block diagram of a primary analog block 55 and a primary digital block 62 in accordance with one embodiment. The primary digital block 62 can be adapted to serve as, for example, the primary slave block 52 of FIG. 4B. Thus, the primary digital block 62 can be configured to operate in conjunction with one or more associated secondary slave blocks within a distributed slave device.

The primary digital block 62 includes a first flip-flop 74, a second flip-flop 76, a multiplexer or mux 72, and a mux control block 77. The first flip-flop 74 is used to generate a SOEN signal for enabling a driver for driving the SDOUT signal of an SPI interface 38 associated with the primary slave block 70. The second flip-flop 76 is used to control the state of the SDOUT signal.

The first flip-flop 74 is electrically connected to a first output of the mux 72, and the second flip-flop 76 is electrically connected to a second output of the mux 72. The mux 72 further includes a plurality of inputs for receiving enable signals SEL(0-n) and output signals SDOUT(0-n) generated by the primary digital block 62 and each secondary digital block associated with the primary digital block 62. For example, in an implementation in which a distributed slave device includes one primary slave device and one secondary slave device, the mux 72 can be configured to receive both a first SEL signal and a first SDOUT signal from the primary slave device and a second SEL signal and a second SDOUT signal from the secondary slave device.

The mux 72 can be configured to select amongst the plurality of SDOUT and SEL signals provided by the primary digital block and each secondary digital block to generate the SDOUT and SOEN signals of the SPI interface 38. For example, the mux control block 77 can analyze the register indicator broadcasted on the SDIN signal of the SPI interface 38 to determine which primary or secondary digital block is associated with the selected register, and that therefore should generate the SDOUT and SOEN signals.

The mux control block 77 can be configured to select the appropriate mux input corresponding to the secondary digital block of the selected register, thereby aiding the distributed slave device in operating as a single device from the perspective of the SPI interface 38. Additionally, the illustrated muxing scheme can aid in decoding a plurality of digital slave blocks before a final flip-flop stage drives a data output of the interface, thereby permitting the distributed slave device to meet the timing requirements of the SPI interface.

FIG. 7 is a register mapping table 80 in accordance with one embodiment. The illustrated mapping table 80 includes 64 register entries 82, which have been partitioned into a first portion 81a, a second portion 81b, a third portion 81c, and a fourth portion 81d.

The register mapping table 80 can be used as a mapping table of the distributed slave device illustrated in FIG. 4B. For example, the first portion 81a of the register mapping table 80 can correspond to the registers associated with primary slave block 52, the second portion 81b of the register mapping table 80 can correspond to the registers associated with secondary slave block 54a, the third portion 81c of the register mapping table 80 can correspond to the registers associated with secondary slave block 54b, and the fourth portion 81d of the register mapping table 80 can correspond to the registers associated with secondary slave block 54c. By partitioning the register mapping table across different blocks of a distributed slave device, a single register mapping table can be used. Furthermore, each block can be configured to monitor an SPI interface to determine when a particular register has been selected by a master device, and to determine if the selected register is located in a portion of the register mapping table associated with the block.

Applications

Some of the embodiments described above have provided examples in connection with mobile phones. However, the principles and advantages of the embodiments can be used for any other systems or apparatus that have needs for serial interfaces.

Such serial interface systems can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. An integrated circuit operable to communicate over a serial interface, the integrated circuit comprising:
    analog circuitry;
    a plurality of registers for controlling the operation of the analog circuitry, the plurality of registers accessible over the serial interface using a shared register address space, the serial interface including an input data signal and an output data signal, the input data signal including a slave address and a register indicator; and
    a distributed slave device including a primary block, a first secondary block, and a shared register mapping table having entries corresponding to the plurality of registers, the entries including a first set of entries corresponding to a first portion of the registers electrically connected to the primary block and a second set of entries corresponding to a second portion of the registers electrically connected to the first secondary block, the distributed slave device selectable over the serial interface by a first value of the slave address, the primary block electrically connected to the serial interface and to the first portion of the registers, and the first secondary block electrically connected to the primary block and to the second portion of the registers, the primary block and the first secondary block configured to receive the slave address and the register indicator from the serial interface, the primary block including a multiplexer configured to generate the output data signal of the serial interface based on selecting amongst a plurality of block outputs including an output provided by the primary block and an output provided by the first secondary block.

2. The integrated circuit of claim 1 wherein each of the registers is individually readable and writable over the serial interface using the distributed slave device and the shared register mapping table.

3. The integrated circuit of claim 2 wherein the primary block is configured to drive the serial interface when the serial interface indicates that a first register associated with the first portion of the registers is being read.

4. The integrated circuit of claim 3 wherein the first secondary block is configured to drive the serial interface when the serial interface indicates that a second register associated with the second portion of the registers is being read.

5. The integrated circuit of claim 1 wherein the serial interface is a serial peripheral interface (SPI) including the input data signal, the output data signal, and a clock signal.

6. The integrated circuit of claim 5 wherein the distributed slave device is selectable over the serial interface by broadcasting a single slave address on the input data signal.

7. The integrated circuit of claim 5 wherein the primary block is electrically connected to the input data signal, the output data signal and the clock signal, and the first secondary block is electrically connected to the input data signal and the clock signal but not to the output data signal.

8. The integrated circuit of claim 7 further comprising a second secondary block electrically connected to the primary block and to a third portion of the plurality of the registers.

9. The integrated circuit of claim 8 wherein the plurality of block outputs further includes an output provided by the second secondary block.

10. The integrated circuit of claim 9 wherein the multiplexer is configured to select amongst the output provided by the primary block, the output provided by the first secondary block, and the output provided by the second secondary block based upon the register indicator received on the input signal.

11. The integrated circuit of claim 1 wherein a digital portion of the first secondary block and a digital portion of the second secondary block are separated by at least about 100 µm so as to reduce routing resources used in electrically connecting the primary block to the first portion of the registers and electrically connecting the first secondary block to the second portion of registers.

12. The integrated circuit of claim 1 wherein the analog circuitry is configured to operate as an envelope tracker for a power amplifier.

13. The integrated circuit of claim 1 wherein the first portion of the registers is configured to control a first portion of the analog circuitry and the second portion of the registers is configured to control a second portion of the analog circuitry.

14. A method of communication using a serial interface, the method comprising:
    receiving over the serial interface a slave address having a first value for selecting a distributed slave device of an integrated circuit, the distributed slave device including (i) a shared register mapping table having entries corresponding to a plurality of registers of the integrated circuit, the entries including a first set of entries corresponding to a first portion of the registers and a second set of entries corresponding to a second portion of the registers; (ii) a primary block associated with the first portion of the registers; and (iii) a first secondary block associated with the second portion of the registers of the integrated circuit, and a shared register mapping table having entries for each of the registers;
    receiving over the serial interface a register indicator indicating a selected register of the integrated circuit, the slave address and the register indicator associated with an input data signal of the serial interface;

receiving the slave address and the register indicator at the primary block and the first secondary block;

driving the serial interface using the primary block when the serial interface indicates that the selected register is associated with the first portion of the registers;

driving the serial interface using the first secondary block when the serial interface indicates that the selected register is associated with the second portion of the registers; and generating an output data signal of the serial interface based on selecting amongst a plurality of block outputs using a multiplexer of the primary block, the plurality of block outputs including an output provided by the primary block and an output provided by the first secondary block.

15. The method of claim 14 wherein the serial interface is a serial peripheral interface (SPI) including the input data signal, the output data signal, and a clock signal.

16. The method of claim 15 further comprising providing the input data signal and the clock signal to the primary block and to the first secondary block.

17. The method of claim 16 further comprising generating the output data signal by multiplexing between an output of the primary block, an output of the first secondary block, and an output of a second secondary block.

18. The method of claim 17 wherein generating the output data signal further includes selecting between the output of the primary block, the output of the first secondary block, and the output of the second secondary block based upon the register indicator.

* * * * *